(No Model.)

F. A. MOORE & A. J. HEABERLIN.
WINDLASS.

No. 281,910. Patented July 24, 1883.

WITNESSES
E. H. Bradford
Jas. L. Falley

INVENTORS
F. A. Moore
A. J. Heaberlin

Attorney

UNITED STATES PATENT OFFICE.

FRANCIS A. MOORE AND ANDREW J. HEABERLIN, OF DENTON, KENTUCKY.

WINDLASS.

SPECIFICATION forming part of Letters Patent No. 281,910, dated July 24, 1883.

Application filed June 18, 1883. (No model.)

*To all whom it may concern:*

Be it known that we, F. A. MOORE and A. J. HEABERLIN, citizens of the United States, residing at Denton, in the county of Carter and State of Kentucky, have invented certain new and useful Improvements in Windlasses, of which the following is a specification, reference being had therein to the accompanying drawings.

Our invention has relation to levers for windlasses and other power-machines, and the object is to provide a lever provided with a socket for attaching it to the shaft or to bolt-heads and the like, and a ratchet-wheel, pawl, and lever, whereby the device may be operated in either direction; and to that end the novelty consists in the construction of the operating-lever, as will be hereinafter more fully described, and particularly pointed out in the claims.

In the accompanying drawings similar letters of reference indicate like parts of the invention.

Figure 1:
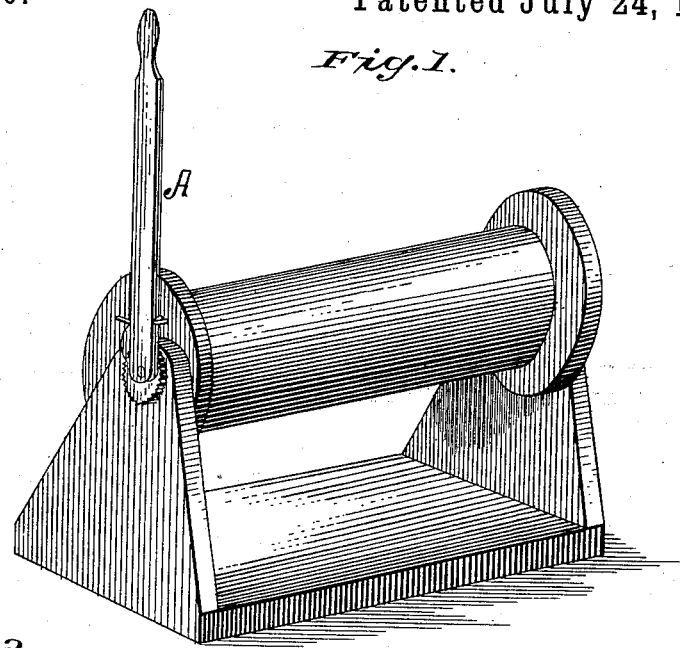
Figure 2:
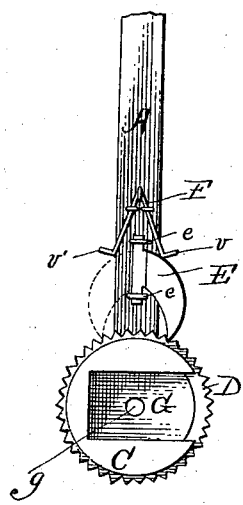
Figure 3:
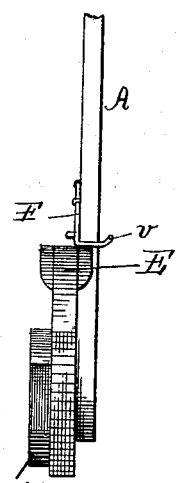
Figure 4:
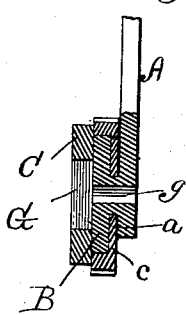

Figure 1 is a perspective elevation of a windlass having our improved lever applied thereto. Fig. 2 is a front view of the lever detached from the shaft. Fig. 3 is an end elevation of the same, and Fig. 4 a vertical central section of the same.

A is the lever, and its lower end or fulcrum has rigidly secured thereto a disk, B, upon which revolves freely a hub, C. This hub has a flange, c, which enters an annular groove, a, between the end of the lever and the disk B, which prevents the displacement of the hub.

The periphery of the hub C is provided with a series of teeth, D, and upon the side of the lever A is hinged a reversible pawl, E, mounted in bearings e e. This pawl engages with the teeth D, and in the position shown in Fig. 2, if the lever were operated, the hub C would be turned to the right; but if the pawl were reversed, as shown in dotted lines, then the hub would be turned to the left.

F is a V-shaped spring provided with two free ends $v\ v'$, one for either position of the pawl, so as to hold it in contact with the teeth on the hub.

G is a square socket, which fits on the square end of the windlass-shaft, and a bolt or stud, passing through the hole $g$, secures the lever in place upon said shaft.

When detached from the windlass the lever may be used as a ratchet or wrench, or for any of the many uses to which it is adapted.

Having thus fully described our invention, what we claim as new and useful, and desire to secure by Letters Patent of the United States, is—

1. The lever A, having disk B, pawl E, and V-shaped springs F, in combination with the hub C, having teeth D, as and for the purpose set forth.

2. The lever A, disk B, and pawl E, in combination with the hub C, having teeth D, and recessed socket G, as set forth.

3. The lever A, having formed on its lower end the disk B, and provided with the spring F and reversible pawl E, in combination with the hub C, mounted upon the disk B, so as to rotate freely, and having the teeth D and socket G, as and for the purpose set forth.

In testimony whereof we affix our signatures in presence of two witnesses.

FRANCIS A. MOORE.
ANDREW J. HEABERLIN.

Witnesses:
A. E. JONES,
B. L. LAWLOR.